Patented Nov. 13, 1934

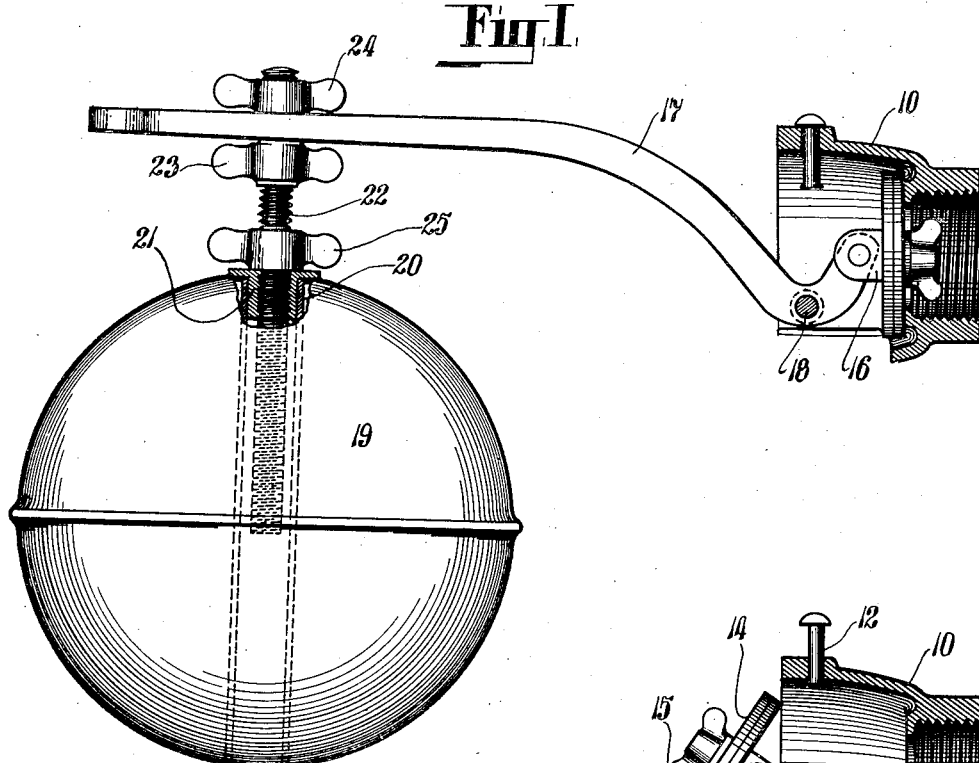
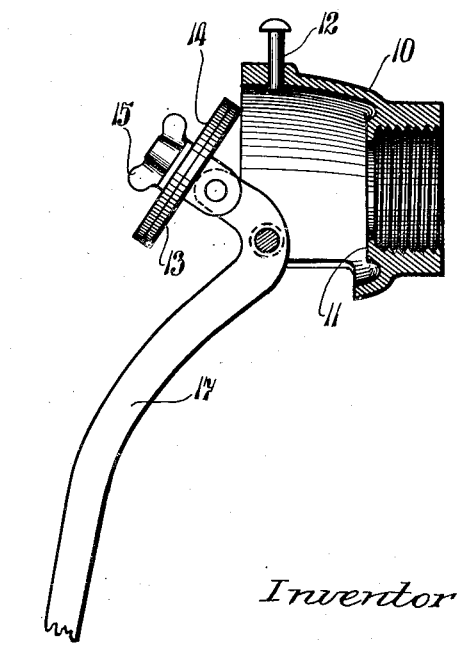

1,980,430

UNITED STATES PATENT OFFICE 1,980,430

FLOAT CONTROLLED VALVE

Frank Newman Pearse, Victoria Park,
Western Australia, Australia

Application July 19, 1933, Serial No. 681,179
In Australia January 25, 1933

2 Claims. (Cl. 251—125)

This invention relates to improvements in float controlled valves.

This invention consists broadly in the use of a bell-shaped valve casing having an enlarged discharge opening so as to allow the water to be thrown forward therefrom and a plate valve normally arranged within the valve casing and adapted to engage the valve seat thereof for controlling the flow of water through the discharge opening of the casing, and this valve plate being aerially supported by means of a float controlled lever so that the valve plate may be caused to move to and from the valve seat or removed entirely from the valve casing in order that the washer carried by said valve plate may be replaced should the same become worn or broken. By reason of the foregoing construction the washer on the valve plate is readily renewable as it can easily be turned into an accessible position.

The foregoing and other features of the invention will be clearly understood by reference to the accompanying drawing, in which—

Fig. 1 is a side elevation mainly sectional of the valve and the float control whilst Fig. 2 is a sectional elevation of the valve showing the valve plate turned into an accessible position for removing the washer.

As shown in the drawing the bell-shaped casing of the valve is referenced 10 and it has a seat 11 closing the port. There is a safety-pin 12 that can be in the position shown either in Fig. 1 or Fig. 2 and the purpose of this safety-pin is subsequently referred to. The valve 13 is in the form of a plate or disc and has a washer 14 of rubber, leather or other pliable material, such washer being held in position by a wing nut 15. The valve plate 13 has a lug or lugs 16 by means of which it is pivoted to a bell-cranked control lever 17. The control lever is pivoted on a rod or bolt 18 connected to wings (not shown) or otherwise to the sides of the casing 10.

Means for varying the float control are used; these comprise a ball float 19 provided with a central tube 20 to which may be fixed an internal threaded guide member 21. Adapted to project to a greater or lesser extent inside the tube 20 is a threaded rod 22 to which is connected a wing nut 23. There are locking wing nuts 24 and 25 placed on the threaded rod 22 whilst the said threaded rod passes through one or other of a tapped passage in the control lever 17. The function of the wing nut 24 is to lock the control rod 17 to the threaded rod 22 and, therefore, to the ball float 19, whilst the function of the wing nut 25 is to lock the threaded rod 22 to the ball float 19.

It will be obvious that, by reason of the construction described the amount of threaded rod 22 that projects beyond the ball float 19 can be increased or decreased and, therefore, the height of water in the tank, trough or other receptacle can be regulated.

When it is necessary to replace the washer 15 the safety-pin 12 is lifted as shown in Fig. 2 and the control lever turned until the plate 13 can be turned clear of the bell-shaped casing such as into the position shown in Fig. 2. The wing nut 15 can be removed, a new washer placed in position and the arrangement re-set into the normal position, being that shown in Fig. 1.

I claim:—

1. A valve construction comprising in combination a casing having a discharge opening and a valve seat therein, a control lever pivotally connected to said casing in front of the valve seat thereof, a valve plate pivotally connected to and supported by said control lever, a washer detachably connected to one face of said valve plate and adapted to engage the valve seat of said casing, a stop pin slidably supported within said casing and extending in the path of travel of said valve plate in order to prevent the removal of said valve plate from said casing, and said control lever being adapted to swing said valve plate clear of said casing when said stop pin has been removed in order that the washer carried by said valve plate may be replaced.

2. A float valve construction comprising in combination a casing having a discharge opening and a valve seat arranged therein, a bell crank pivotally supported directly in front of the valve seat of said casing, said bell crank having an operating arm and a short arm, a valve pivotally connected to the short arm of said crank whereby with movement of said operating crank said valve may be moved to and from said valve seat, a stop for controlling the movement of said valve in one direction, and means whereby said stop may be moved out of the path of travel of said valve whereby the latter will be accessible from without said casing.

FRANK NEWMAN PEARSE.